March 20, 1962  D. GASCOIGNE ET AL  3,026,048
DUPLEX LIQUID FUEL BURNER NOZZLES
Filed March 16, 1961
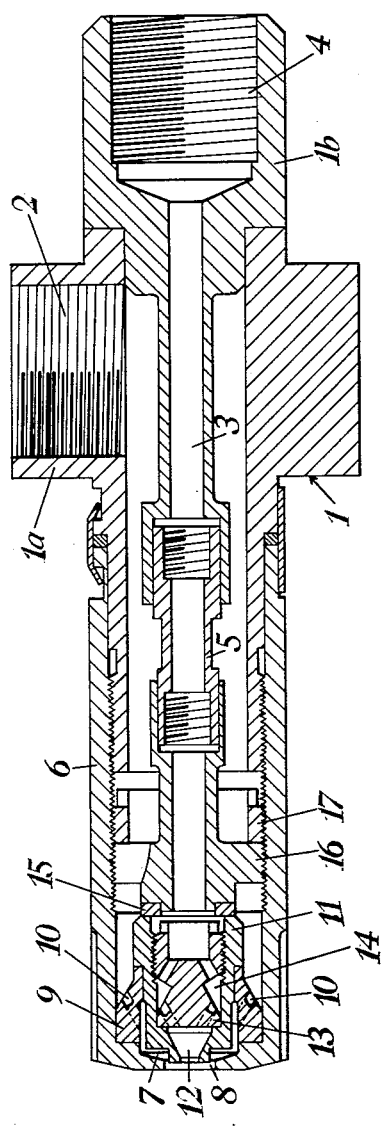

United States Patent Office 3,026,048
Patented Mar. 20, 1962

3,026,048
DUPLEX LIQUID FUEL BURNER NOZZLES
Denis Gascoigne, Coughton, Alcester, and Sidney C. Watkins, Burnley, England, assignors to Joseph Lucas (Industries) Limited, Birmingham, England
Filed Mar. 16, 1961, Ser. No. 96,317
1 Claim. (Cl. 239—424)

This invention relates to duplex liquid fuel burner nozzles of the kind adapted to provide a pair of concentric fuel jets, the inner one being a pilot jet and the outer one being the main fuel jet.

The object of the invention is to provide a construction from component parts which can be readily assembled in accurate relationship and which ensures effective nebulisation of the jets issuing from the nozzle.

In accordance with the invention a duplex liquid fuel burner nozzle of the kind specified, comprises in combination a substantially cylindrical hollow body having at a position intermediate its ends a lateral main fuel inlet, and having at one end a pilot fuel inlet, a conduit communicating at one end with the pilot fuel inlet, and extending coaxially through a portion of the hollow body in spaced and rigid relationship thereto, a hollow cylindrical extension coaxial with, and in screw-thread engagement with the exterior of the end portion of the hollow body remote from the pilot fuel inlet, a main fuel jet nozzle formed by the outer end of the hollow cylindrical extension, a pilot fuel jet nozzle situated coaxially within the outer end of the hollow cylindrical extension, a ported ring supporting the pilot jet nozzle within the outer end portion of the hollow cylindrical extension, a ported plug mounted within the pilot jet nozzle, a peripherally gapped brush in screw-thread engagement with the internal peripheral surface of the hollow cylindrical extension, and situated at the inner end of the pilot jet nozzle to secure the latter, together with the ported ring and plug, within the outer end of the hollow cylindrical extension, a locking ring in screw-thread engagement with the internal peripheral surface of the hollow cylindrical extension at a position between the bush and the adjacent end of the hollow body, and abutting against the bush to prevent movement thereof, and a tube arranged coaxially with, and extending between the adjacent ends of, the bush and conduit, the adjacent ends of the bush and conduit being provided with sockets which are complementary to, and slidably accommodate, the adjacent ends of the tube.

The accompanying drawing is a longitudinal sectional view of an example of the invention.

Referring to the drawing there is provided a substantially cylindrical hollow body 1 which conveniently is formed by two parts 1a, 1b secured together as by brazing. The main jet fuel is supplied to the interior of the hollow body through a lateral inlet and pipe connection 2 in the part 1a at a position intermediate the ends of the body. In the body is also formed conduit 3 which extends coaxially through a portion of the body, and to one end of which the pilot jet fuel is supplied through another inlet and pipe connection 4 formed in the part 1b at the rear end of the body, whilst at the other end of the conduit 3 is formed a socket for reception of one end of a pilot jet feed tube 5.

The forward end of the part 1a of the body is externally screw-threaded, and to this end is attached a hollow cylindrical extension 6 having along a part of its length an internal screw-thread for engagement with the screw-thread on the body part. The interior of the forward end of the extension 6 is shaped to form a truncated conical swirl chamber 7 for the main fuel jet, this chamber having a discharge orifice 8 at its apex. In the forward end of the extension 6 is inserted a main fuel feed ring 9 having therein a plurality of ports 10 so disposed that the fuel passing therethrough enters the swirl chamber tangentially. In the feed ring 9 is supported a hollow pilot jet nozzle 11 which is shaped internally to form a swirl chamber 12 terminating at its apex in a discharge orifice which is coaxial with that of the main fuel swirl chamber 7. Within the rear end of the pilot jet nozzle is inserted a feed plug 13 having thereon a circumferential groove 14. Ports in one end of the plug 13 lead the pilot jet fuel to the groove 14 and ports in the other end of the plug lead the fuel from the groove 14 to the swirl chamber 12, the latter ports being so disposed that the fuel enters the swirl chamber tangentially.

In contact with the rear end of the pilot jet nozzle 11 is inserted an annular washer 15 and all the components so far described within the extension are held in position by an externally screw-threaded bush 16 which is engaged with the screw-thread in the extension, the bush being secured by an externally screw-threaded locking ring 17.

The bush has formed in its periphery gaps through which the main jet fuel can flow from the body and through the locking ring to the main jet nozzle. Also in the bush 16 is formed a socket which receives one end of the pilot jet feed tube 5, the ends of the tube being adapted to form a push-fit into the socket in the bush and the socket in the body.

The control of the main and pilot jet fuels supplied through the feed pipe connections is effected by any convenient means which form no part of the invention.

Having thus described our invention what we claim as new and desire to secure by Letters Patent is:

A duplex liquid fuel burner nozzle of the kind specified, comprising in combination a substantially cylindrical hollow body having at a position intermediate its ends a lateral main fuel inlet, and having at one end a pilot fuel inlet, a conduit communicating at one end with said pilot fuel inlet, and extending coaxially through a portion of said hollow body in spaced and rigid relationship thereto, a hollow cylindrical extension coaxial with, and in screw-thread engagement with the exterior of, the end portion of said hollow body remote from said pilot fuel inlet, a main fuel jet nozzle formed by the outer end of said hollow cylindrical extension, a pilot fuel jet nozzle situated coaxially within the outer end of said hollow cylindrical extension, a ported ring supporting said pilot jet nozzle within the outer end of said hollow cylindrical extension, a ported plug mounted within said pilot jet nozzle, a peripherally gapped bush in screw-thread engagement with the internal peripheral surface of said hollow cylindrical extension, and situated at the inner end of said pilot jet nozzle to secure the latter, together with said ported ring and plug, within the outer end of said hollow cylindrical extension, a locking ring in screw-thread engagement with the internal peripheral surface of said hollow cylindrical extension at a position between said bush and the adjacent end of said hollow body, and abutting against said bush to prevent movement thereof, and a tube arranged coaxially with, and extending between the adjacent ends of, said bush and said conduit, the adjacent ends of said bush and conduit being provided with sockets which are complementary to, and slidably accommodate, the adjacent ends of said tube.

References Cited in the file of this patent

UNITED STATES PATENTS

| 2,701,164 | Purchas et al. | Feb. 1, 1955 |
|---|---|---|
| 2,878,065 | Watkins | Mar. 17, 1959 |
| 2,965,311 | Gascoigne | Dec. 20, 1960 |